(12) United States Patent
Colakoglu

(10) Patent No.: US 10,599,876 B2
(45) Date of Patent: Mar. 24, 2020

(54) DATA COMMUNICATION METHOD BETWEEN A STYLUS AND A TABLET COMPUTER

(71) Applicant: Osman Colakoglu, Istanbul (TR)

(72) Inventor: Osman Colakoglu, Istanbul (TR)

( * ) Notice: Subject to any disclaimer, the term of this patent is extended or adjusted under 35 U.S.C. 154(b) by 0 days.

(21) Appl. No.: 16/426,731

(22) Filed: May 30, 2019

(65) Prior Publication Data

US 2019/0325169 A1 Oct. 24, 2019

Related U.S. Application Data

(63) Continuation-in-part of application No. 15/915,612, filed on Mar. 8, 2018, now Pat. No. 10,325,571, which is a continuation-in-part of application No. 14/122,053, filed as application No. PCT/TR2012/000077 on May 24, 2012, now Pat. No. 9,939,886.

(30) Foreign Application Priority Data

May 24, 2011 (TR) ................................. 2011 05036

(51) Int. Cl.
*G06F 21/83* (2013.01)
*G06F 3/044* (2006.01)
*G06F 3/0354* (2013.01)

(52) U.S. Cl.
CPC .......... *G06F 21/83* (2013.01); *G06F 3/03545* (2013.01); *G06F 3/044* (2013.01); *G06F 2203/04104* (2013.01)

(58) Field of Classification Search
CPC ..... G06F 3/002; G06F 3/044; H04N 1/00129; H04N 1/00347; H04N 2201/0048; H04N 2201/006; H04N 2201/0053; H04N 2201/0084; H04N 2201/0089; H04N 2201/0087; H04B 10/116; H04B 10/114; H04B 10/1141; H04B 10/1143
See application file for complete search history.

(56) References Cited

U.S. PATENT DOCUMENTS

| | | | |
|---|---|---|---|
| 2008/0278588 A1* | 11/2008 | Greenberg | H04N 5/232 348/207.99 |
| 2011/0284632 A1* | 11/2011 | Mullen | G06Q 20/352 235/380 |
| 2013/0231046 A1* | 9/2013 | Pope | G06K 9/00013 455/41.1 |
| 2015/0195007 A1* | 7/2015 | He | H04B 5/0012 455/41.1 |
| 2019/0158147 A1* | 5/2019 | Hofmann | G06K 7/081 |

* cited by examiner

*Primary Examiner* — Bryan Earles
(74) *Attorney, Agent, or Firm* — Egbert, McDaniel & Swartz, PLLC

(57) ABSTRACT

A data transfer method after the connection of electronic devices that can store information and/or generate information wherein one of the devices can transfer the data to the image display of the other device. For instance, the method is applied between a first device as a stylus and a second device as a tablet computer with capacitive touch panel wherein the method provides mutual data signals using negative electrical signals and light signals, and to control and modify these data signals by means of different sensors.

12 Claims, 5 Drawing Sheets

DATA COMMUNICATION METHOD BETWEEN A STYLUS AND A TABLET COMPUTER

CROSS-REFERENCE TO RELATED APPLICATIONS

The present application is a continuation-in-part of the U.S. patent application Ser. No. 15/915,612, filed on Mar. 8, 2018, presently pending. U.S. patent application Ser. No. 15/915,612 is a continuation-in-part of the U.S. patent application Ser. No. 14/122,053, filed on Nov. 25, 2013, which issued as U.S. Pat. No. 9,939,886 on Apr. 10, 2018.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the method enabling wireless sharing of files or data via touch surface between electronic devices that can store information and/or generate information.

The present invention especially relates to the data transfer method after the connection of the electronic devices that can store information and/or generate information wherein one of the devices can transfer the data to the image display of the other device by graphically. For instance, the method is applied between a first device as a stylus and a second device as a tablet computer with capacitive touch panel wherein the method provides mutual data signals using negative electrical signals and light signals, and to control and modify these data signals by means of different sensors.

2. Description of Related Art Including Information Disclosed Under 37 CFR 1.97 and 37 CFR 1.98

There are two methods, wired and wireless, of data sharing between electronic devices. In the data transmission via cables, there are adverse circumstances such as the possibility of the cables being lost; not available to the user; not compatible with the device such as computers, etc. to which the data will be transmitted. Another problem is the failure to establish data transmission when the cable is deformed.

Another problem encountered in the current state of the art is that there are risks such as the computer not recognizing the external apparatus when external devices such as flash memory, memory card, etc. are used.

There is the breakdown possibility of the plug-in-out apparatus (cable, flash memory, memory card, etc.) during the plugging in and out thereof to and from the device such as computers, etc. to which the data will be communicated. Similarly, corresponding parts of the cameras, mobile phones, etc. to which the data will be transmitted can be damaged. Moreover, there is a high risk of experiencing data loss in the memory cards or flash memories during the wrong use of plug-in-out apparatus.

Location of the relevant memory card cannot be known to all of the users when using media tools such as cameras, mobile phones, etc. and there is a risk of loss while plugging and removing the memory card, therefore, there is a risk of data loss.

During the wireless transmissions (such as the data transfer which will be carried out only with Bluetooth) there is a risk of sending the data to a different user.

Bluetooth data sharing method used in the current state of the art can also be employed. However, this method is manual. Primarily, devices should be manually introduced to each other for communication between them. Data communication by means of this method takes longer and thus is more difficult. This is because the user must introduce the devices to each other and find the location of files on the computer.

Users may have difficulty in locating the relevant folder in the operating system if the computer doesn't automatically show the removable devices on the screen during the plugging in of these devices. For instance, let's say that a user goes to a printing centre and the employees of the centre use table-shaped computers. And the user wants the birthday photos taken at their home to be printed. In this case, the duration for the activation of the Bluetooth feature of the camera and introduction of this camera to the computer is 5 to 10 minutes for a person familiar with these operations. This situation will cause the job of the user to take longer or not preferring data import from the cameras.

In prior art, the location of the stylus is automatically determined according to the position where signal sends. But in order to determine the direction of the stylus according to the tablet computer, the stylus must include at least one compass sensor or both of them (the tablet computer and the stylus) have to include compass sensors. Otherwise, the screen image of the other device placed on the screen will be independent of the device. The user will have to set this direction by realizing a second action. In prior art, it is not disclosed a method which control and modify these data signals between a first device and a second device by means of the compass sensor, the inclination sensor and the pressure sensor which are placed on one or both of the first and second devices.

In conclusion, an improvement in the relevant technical field rendered necessary due to the negative aspects mentioned above and insufficiency of the current solutions.

OBJECT OF THE INVENTION

The invention is developed by being inspired from existing conditions and seeks to solve the above mentioned drawbacks.

The object of the present invention is to improve a method which is applied between a first device as a stylus and a second device as a tablet computer with capacitive touch panel, wherein it is used to transmit mutual data signals using negative electrical signals and light signals, and to control and modify these data signals by means of the compass sensor, inclination sensor and pressure sensor which are placed on one or both of the devices.

The object of the present invention is to enable quick wireless sharing of files or data between electronic devices that can store information and/or generate information.

Another object of the present invention is to eliminate the need for cables used in the current state of the art thanks to the wireless connection of the electronic devices with each other.

Another object of the present invention is to eliminate cable incompatibility between different models of electronic devices as cable is not required for connection.

Another object of the present invention is to prevent any deformation of the parts of removable devices as cable is not required for connection.

Another object of the present invention is to provide a means for users of all ages thanks to the easy use thereof.

Another object of the present invention is to enable even the users who do not know a foreign language sending data thanks to the simple transfer mode provide.

Another object of the present invention is to eliminate the problem of waste of time thanks to the devices quickly establishing communication with each other.

Another object of the present invention is to facilitate data communication of increasingly used electronic devices of today such as tablet computers with capacitive multi-touch panel and a stylus with each other, making this method functional.

BRIEF SUMMARY OF THE INVENTION

The present invention for fulfilling the above-described objects is a method of wireless data communication between a first device and a second device, the method comprising;
   turning on the first device and the second device, the first device capable of data generation and/or data storage, the second device capable of data generation or data storage, said second device is electrically connected with a capacitive multi-touch panel;
   turning on the first device;
   placing the first device on the capacitive multi-touch panel connected with the second device;
   sending the signals defining the identification and position information of the first device on the capacitive multi-touch panel;
   receiving the signals sent by the first device on the capacitive multi-touch panel;
   blanking of the image blanking unit located within the capacitive multi-touch panel, corresponding to the bottom of the first device;
   sending of the information from the second device to the first device, containing the confirmation that the identity and location of the first device is received and it is ready to receive data, by means of light signals through the data transfer units;
   identification by the first device through converting the light signals emitted by the data transfer units into data thereof that the second device recognized it and is ready to receive data;
   transferring the data by using capacitive multi-touch panel from the first device to the second device or from the second device to the first device;
   after performing the data transmission that the user wishes to perform, the user disconnects the connection of the first device with the second device;
wherein; the method further comprises
   a stylus with a conductor tip, is used as the first device, a tablet computer with a capacitive multi-touch panel, is used as the second device,
   the identity of the stylus is transferred to the tablet computer by means of the negative electric signals which is created in a manner that the conductor tip touches to the capacitive multi-touch panel of the tablet computer,
   the tablet computer sends the light signals to the stylus by using the display units under the capacitive multi-touch panel,
   these light signals is taken by a light sensor of the stylus,
   after the mutual data signals have been transmitted, the two devices recognize each other and mutual handshake is ensured.

In a preferred embodiment of the present invention, the data is transferred by using capacitive multi-touch panel from the stylus to the tablet computer by negative electric signals or from the tablet computer to the stylus by the light signals.

In a preferred embodiment of the present invention, the stylus includes a compass sensor which controls the directional changes of the tablet computer.

In a preferred embodiment of the present invention, the stylus includes an inclination sensor to find the angle of the tablet computer and the stylus relative to each other.

In a preferred embodiment of the present invention, the stylus includes a pressure sensor for measuring the pressure applied to the capacitive multi-touch panel of the tablet computer.

In a preferred embodiment of the present invention, the stylus includes a processor, a circuit board and a electrical supply for data storage and communication.

In a preferred embodiment of the present invention, the tablet computer may include an inclination sensor to find the angle of the stylus which moves on it.

In a preferred embodiment of the present invention, the tablet computer may include a compass sensor to find the direction of the stylus which moves on it.

In a preferred embodiment of the present invention, when said stylus performs A-Motion, B-Motion is made in the same direction in the graphic area of the tablet computer, and these motions (A, B) can be realized with the compass sensor placed in the stylus.

In a preferred embodiment of the present invention, the stylus forms an input chart to be used for drawing on the graphic area under the capacitive multi-touch panel in am manner that said input chart is formed by giving the negative electricity which is continuously open to the capacitive multi-touch panel.

The structural and the characteristic features and all advantages of the invention will be understood more clearly with the detailed description written by referring to the following figures and therefore, the evaluation needs to be done by taking these figures and the detailed description into consideration.

DESCRIPTION OF REFERENCE NUMERALS

Figure 1:
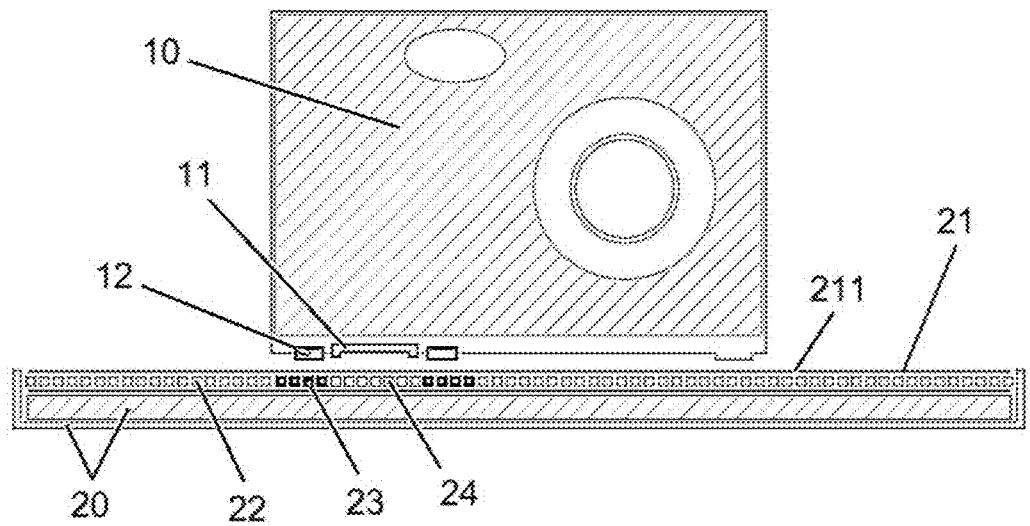
FIG. 1 is a representational view of the elements used in the data communication method via touch surface according to the invention.
Figure 2:
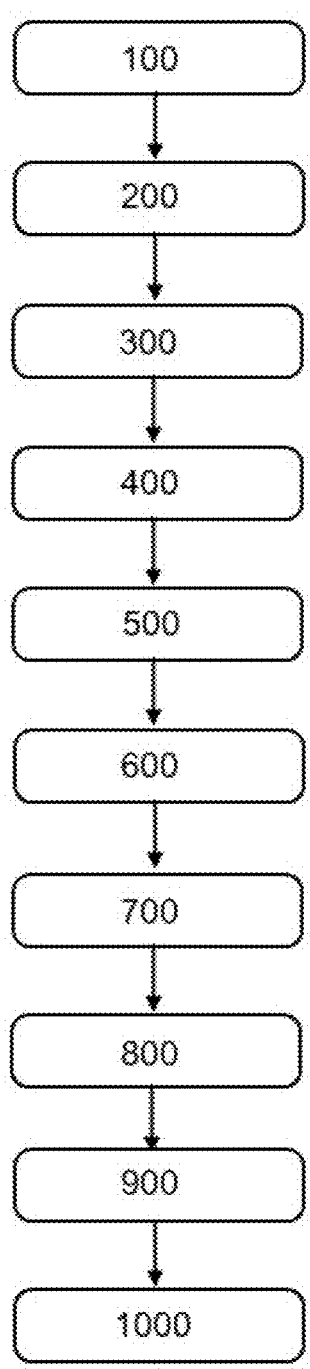
FIG. 2 is a flow diagram showing the process steps of the data communication method via touch surface according to the invention.

10. First device
11. Photo sensor
12. Conductive frame
13. Processor
14. Circuit board
15. Electrical supply
16. Conductor tip
17. Light sensor
18. Compass sensor
19. Inclination sensor
101. Pressure sensor
20. Second device
21. Capacitive multi-touch panel
211. Capacitive multi-touch surface
212. Graphic area
2121. Input chart
22. Image forming units
23. Image blanking units
24. Data transfer units
25. Circuit board
26. Processor
27. Display units
28. Compass sensor
29. Inclination sensor

DESCRIPTION OF THE PROCESS STEPS

100. Turning the first device (10) and the second device (20) on
200. Turning the first device (10) on for sending commands triggering the second device (20) as negative electrical signals through conductive frame part (12)
300. Placing the first device (10) on the capacitive multi-touch surface (211) connected with the second device (20)
400. Sending the signals enabling the detection of the identity and position information of the first device (10) on the multi-touch panel (21) to the second device (20) through conductive frame (12) over capacitive multi-touch surface (211)
500. Reception of the signals sent over capacitive multi-touch surface (211) through the conductive frame (12) by the second device (20)
600. Blanking of the corresponding area of the second device (20) located below the conductive frame (12), for image blanking unit (23) located below capacitive multi-touch surface (211) sending signal
700. Sending of the information from the second device (20) to the first device (10), containing the identity information of the second device (20) and the confirmation that the identity and location of the first device (10) is received and it is ready to receive data, by means of light signals through switching the data transfer units (24) corresponding to the middle of image blanking units (23) on and off
800. Identification by the first device (10) through converting the light signals emitted by the data transfer units (24) into data by means of photo sensor (11) thereof that the second device (20) recognized it and is ready to receive data
900. Transferring the data by using capacitive multi-touch panel (21) from the first device (10) to the second device (20) or from the second device (20) to the first device (10) depending on the preference of user
1000. Disconnection of the first device (10) from the second device (20) after the user performs the desired data transfer Scaling of drawings is not absolutely required and details, which are not needed for understanding the present invention, can be neglected. Furthermore, elements, which are at least substantially identical or have at least substantially identical functions, are indicated with the same number.

DETAILED DESCRIPTION OF THE INVENTION

In this detailed description, preferred process steps of the data communication via multi-touch surface according to the invention are explained only for a better understanding of the subject matter.

Data communication according to the present invention using multi-touch surface comprises the following: first storage device (10); photo sensor (11); conductive frame (12); and second storage device (20) on which multi-touch panel (21) comprising multi-touch surface (211) is provided.

Capacitive multi-touch panel (21) is provided on the second device (20) and connected electrically to the second device (20). Here the term multi refers to multi-touch panel (21) being sensitive to a plurality of electronic devices. Capacitive multi-touch panel (21) provides data input to any electronic device by means of touching operation, wherein it comprises capacitive touch surface (211) preferably allowing usage by the finger. Said panel (21) can be any other type of panel having the multi-touch feature and being sensitive to negative or positive electricity.

The image on the capacitive multi-touch panel (21) is provided by means of the image forming unit (22), image blanking unit (23) and data transfer units (24), all of which are located just below the capacitive multi-touch surface (211) and preferably composed of LEDs. Said units (22, 23, 24) are preferably LED, wherein the image on the capacitive multi-touch panel (21) can also be provided by means of a projector, led, a plasma or LCD screen.

The first device (10) and the second device (20) are characterized in that both can generate and store data and at least one of the two (10, 20) has a capacitive multi-touch surface (211). Therefore, the first device (10) and the second device (20) may also be a mouse or keyboard, as well as telephone, a tablet PC, camera or a hard disk such that at least one of the two said devices to be provided with data communication comprise capacitive multi-touch surface (211). In this detailed description operations performed will be described with the camera (10) as the first device (10) and the table-shaped computer (20) as the second device (20).

Conductive frame (12) is made of metallic material and surrounds the photo sensor (11). Conductive frame (12) is used to transmit data from the camera (10) to the table-shaped computer (20) by means of negative electricity. Photo sensor (11) is used to measure light intensity of the data transfer units (24) provided in the table-shaped computer (20).

Data communication method via multi-touch surface according to the invention takes place as follows. First, the user turns the camera (10) and the table-shaped computer (20) on by means of pressing on the on and off buttons provided thereon (100). When the first device (10) is turned on it sends signal to the conductive frame (12). Then, the user places the camera (10) on the touch panel (21) such that the conductive metal frame (12) stays on the capacitive multi-touch surface (211) of the capacitive multi-touch panel (21) (300). The camera (10) starts to send the signals, required for its introduction to the table-shaped computer (20), to the touch panel (21) through conductive frame (12) and using negative electricity (400). The computer (20) starts to receive said signals by means of the capacitive multi-touch panel (21) and acquires information comprising identity of the camera (10) and location thereof on the capacitive multi-touch surface (211) (500). Now, the information regarding the camera (10) is received by the computer (20). In this case, the computer (20) should start to communicate with the camera (10). Thus, the computer (20) blanks the corresponding area below the conductive metal frame (12) for the photo sensor (11) provided in the camera (10) by preventing light emission of the image blanking units (23) provided in the touch panel (21) (600). With this process, the computer (20) starts to send signal to the photo sensor (11) by means of the data transfer units (24) provided in the middle of the blanked area for transferring data to the camera (10) (700). These sent signals comprise information confirming that relevant information about the camera (10) is received and the computer (20) is ready to receive data. At this point, actually, the difficult and time consuming introduction process, i.e. introduction of the camera (10) to the table-shaped computer (20) is obtained. Now, at this moment, the user may choose a method for data communication between the camera (10) and the table-shaped computer (20) or proceed with the already chosen method. After the introduction process of the devices (10, 20) to each other, the user may maintain the connection between the camera (10) and the table-shaped computer (20) by means of light and electrical signals as in the introduction process or may prefer to carry out communication by means of radio frequency. In the case that the user prefers to perform the communication via radio frequency, he or she may choose communication via Bluetooth (wireless connection for short distances) or Wi-Fi (wireless connection). Then, the user can perform desired operations via multi-touch surface (211) or a button or buttons provided on the camera (10) (900).

User requests such as sending photos, videos, etc., sending and receiving signal by means of light signals take place as follows: sending of the signal from the camera (10) to the table-shaped computer (20) proceed from the conductive metal frame (12) towards the capacitive multi-touch surface (211) while sending of the signal from the table-shaped computer (20) to the camera (10) proceed from the data transfer units (24) towards the photo sensor (11).

Upon completion of the data sending and receiving processes, the user performs disconnection process of the camera (10) from the computer (20) (1000). This process can be carried out by pressing the on off buttons of either the camera (10) or the table-shaped computer (20) or by removing the camera (10) from the capacitive multi-touch surface (211) (1000).

Figure 3:
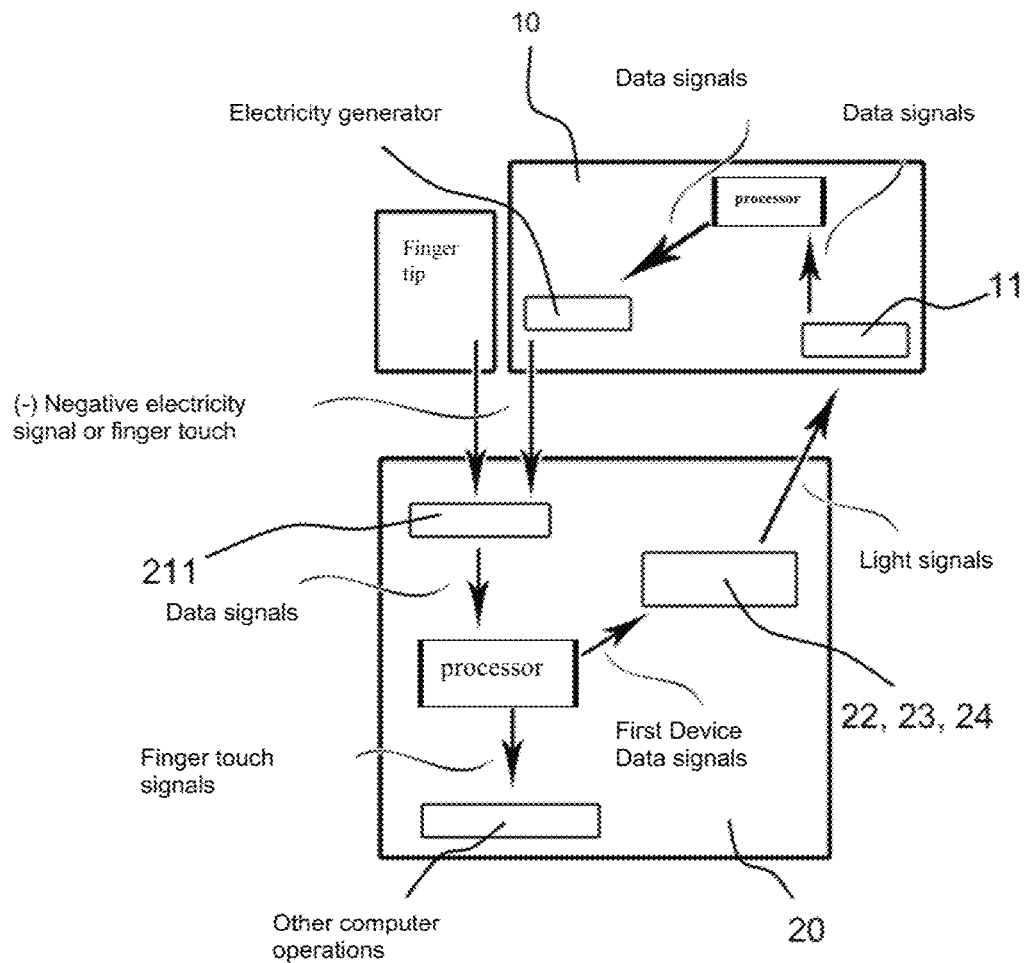
FIG. 3 is a schematic view showing the data communication between the first device and the second device of the data communication method via touch surface according to the invention.

In FIG. 3, a schematic view showing some process steps of the data communication method via touch surface according to the invention and data communication between the first device (10) and the second device (20) is given. First, the first and the second device (10, 20) are turned on. Then, energy is given to the conductive frame (12) by means of the electricity generator of the first device (10). As shown in FIG. 3, the first electronic device (10) is placed on the capacitive multi-touch surface (211). The first device (10) sends data signals to the second device (20) through the conductive frame (12) by means of negative electrical signals thanks to the capacitive feature of the capacitive multi-touch surface (211). Said data signals is processed within the processor of the second device (20) and said processor (20) generates data comprising information confirming that the second device (20) recognized the first device and it is ready to receive data. Data transfer units (24) send this information to the photo sensor (11) by means of light signals. Data signals received by the photo sensor (11) are sent to the processor of the first device (10). Processor receives these data signals and generates the information that it is now ready to send data. After these operations, content of the first device (10) is displayed on the capacitive multi-touch surface (211). List of data types (photo, video, etc.) contained within the first device (10) is displayed right next to the said device.

Then, the user moves their finger on the capacitive surface (211) for arranging the content displayed on the capacitive multi-touch surface (211). Capacitive surface (211) detects touching of the finger and the processor of the second device (20) performs computer operations according to the requests of the user.

The most important point in the data communication via capacitive multi-touch surface (211) is that the camera (10) is introduced to the table-shaped computer (20) in an easy manner and the data desired to be sent from the camera (10) to the table-shaped computer (20) is shown with respect to the position of the camera (10) on the table-shaped computer (20). For instance, let's say that a table-shaped computer (20) is available and 2 cameras (10) are placed on table-shaped computer (20). By this way, content for each camera (10) will be shown around thereof. This, in turn, will provide an easy way to find and manage the photos and videos contained the cameras (10) on the capacitive multi-touch surface (211).

The following example can be given for an application of the data communication method via touch surface. In the printing centres, there are table-shaped computers (20) comprising touch panels (21). The user places the camera (10) on the table-shaped computer (20). The camera (10) and the computer (20) communicate quickly with each other thanks to the data communication mentioned above. Then, the data is transferred to the table-shaped computer (20) through this method taking place by means of light signals or radio frequency signals initiated by this method.

In this detailed description, the additional process steps are further described for better understanding of the subject, with regard to a new method is applied between a first device (10), which is a stylus, and a second device (20), which is a tablet computer with capacitive multi-touch panel (21), wherein said method provides a wireless data communication between a first device (10) and a second device (20) with the mutual data signals using the negative electrical signals and the light signals, and further that these data signals are controlled and modified by means of the different sensors which are placed on one or both of the devices.

Figure 4:
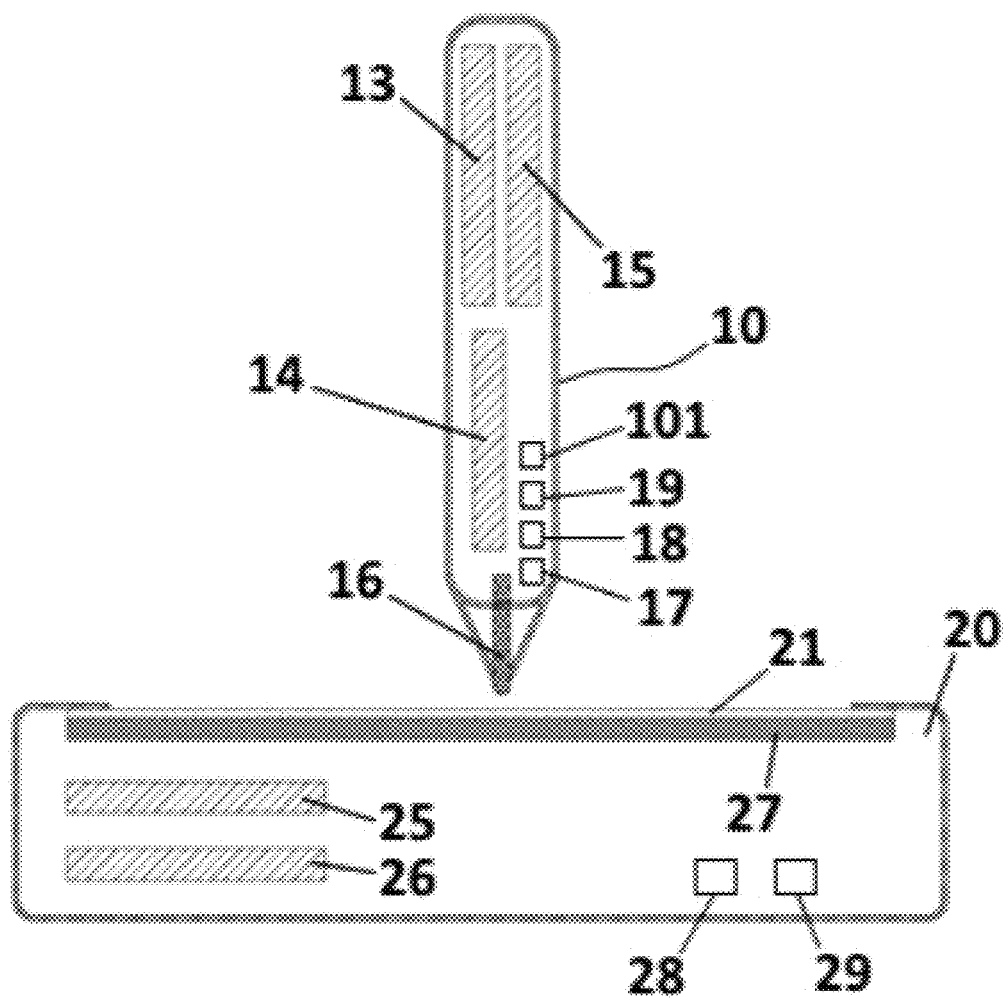
FIG. 4 is a representational view of the data communication method between a stylus and a tablet computer.

As it seen in FIG. 4, the stylus has a conductor tip (16) that affects the capacitive multi-touch panel (21) of the tablet computer. A battery is used as an electrical supply (15). And the stylus has a circuit board (14) and a processor (13) which are used for data storage and communication. And at least one light sensor (17) is used to receive the light signals from the tablet computer for wireless data communication. In addition, the first device (10) includes a pressure sensor (101) for measuring the pressure applied to the capacitive multi-touch panel (21) of the tablet computer. Further that, the first device (10) includes an inclination sensor (19) to find the angle of the tablet computer and the stylus relative to each other and further that said first device (10) includes a compass sensor (18) which controls the directional changes of the tablet computer.

The tablet computer has a capacitive multi-touch panel (21) and display units (27) under it. For more sensitive data signals, although not necessary, the tablet computer can include an inclination sensor (29) to find the angle of the stylus which moves on it. Further that, the tablet computer can include a compass sensor (28) to find the direction of the stylus which moves on it.

The wireless data communication between the stylus and tablet computer will be explained. This data communication is generated by data signals depending on whether the electricity consisting of 1 and 0 is turned on and off Data communication starts as soon as the conductor tip (16) of the stylus touches the capacitive multi-touch panel (21) of the tablet computer. The identities of the stylus and the tablet computer are transmitted to each other via mutual data signals.

Firstly, the identity of the stylus is transferred to the tablet computer by means of the negative electric signals which is created in a manner that the conductor tip (16) touches to the capacitive multi-touch panel (21) of the tablet computer. After that, the tablet computer will send the light signals to the stylus by using the display units (27) and these light signals will be taken by the light sensor (17) of the stylus. After the mutual data signals have been transmitted, the two devices will recognize each other and mutual handshake will be ensured.

The negative electricity comes from the conductor tip (16) of the stylus where it touches the capacitive multi-touch panel (21) of the tablet computer. Said conductor tip (16) is the end point of the stylus. Negative electricity coming from the conductor tip (16) can always remain open at point 1 to generate a continuous signal. This signal will always remain on, so that the stylus can create a line or any interaction on the capacitive multi-touch panel (21) of the tablet computer. In the meantime, if the data signal is to be sent again, the data signals consisting of 1 and 0 will be transmitted to the opposite side using negative electricity. For example, while a line is drawn to the capacitive multi-touch panel (21), when the stylus is inclined slightly, the data signals will be used again to define how the new drawing will be, and said data signals will be transmitted to the capacitive multi-touch panel (21) as data pulses.

The compass sensor (18) can vary the contents of the data signal from the stylus to the tablet computer depending on the changes in the direction of the tablet computer. For example, the angle between a graphical area (212) formed on the capacitive multi-touch panel (21) of the tablet computer and the stylus, can be adjusted. The compass sensor (18) may also affect the content of an interaction on the capacitive multi-touch panel (21) in the event that continuous negative electricity is on. For example, when the orientation of the stylus is important, different data can be sent by rotating the stylus.

The inclination sensor (19) can be used to measure the angle of the stylus relative to the tablet computer. The data comes from the stylus may vary according to the angle of the stylus. When the stylus is held upright, the data that is normal, can change the data signals transmitted from the stylus to the tablet computer when held obliquely.

Finally, the pressure sensor (101) also measures the pressure applied at the point where the stylus touches the tablet computer during the data signals transmitted to the tablet computer. According to this pressure, the data signal transmitted by the negative signals from the stylus to the tablet computer, will be differentiated according to the applied pressure.

All sensors allow the data signals from the stylus to the tablet computer to change or occur again. For example, a drawing is made on the capacitive multi-touch panel (21) of the tablet computer with the stylus, the types of the drawings can be controlled by these sensors. These data is transferred to the tablet computer by data signals and can change how the drawing will be.

Figure 5:
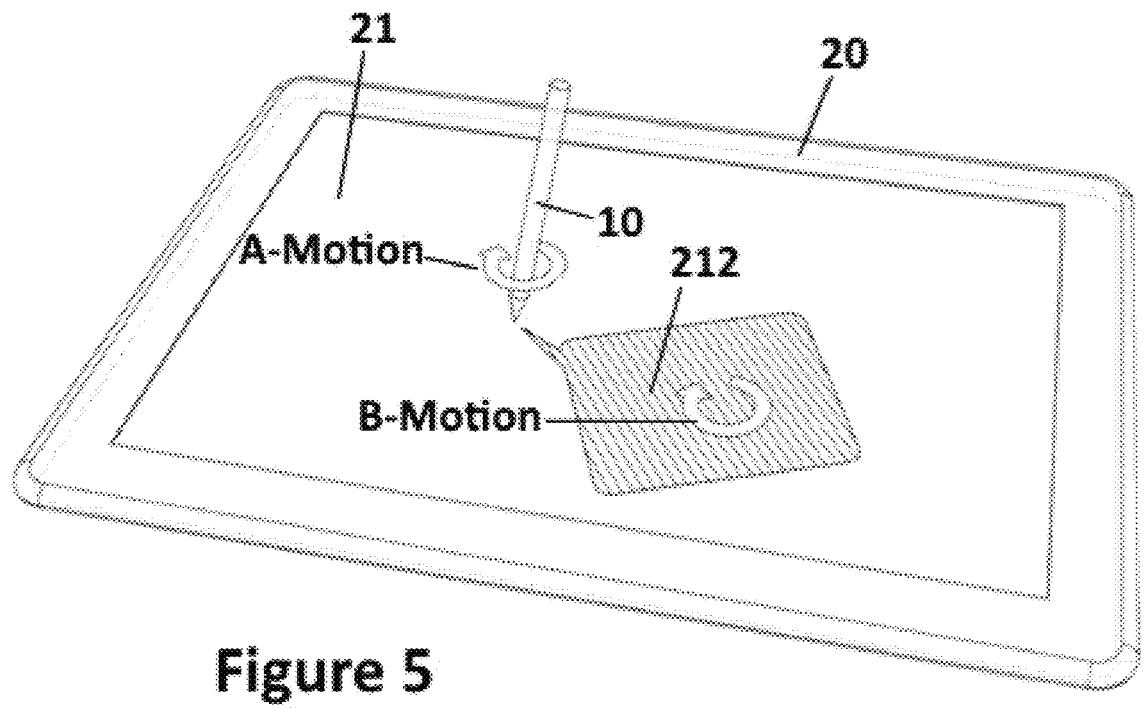
FIG. 5 shows the operating principle of a compass sensor on the first device.

As it seen in FIG. 5, the operating principle of a compass sensor (18) on the first device (10) is described. In a preferred application of the invention, the first device (10) is a stylus and the second device (20) is a tablet computer with a capacitive multi-touch panel. Wherein said stylus performs A-Motion, B-Motion is made in the same direction in the graphic area (212) of the tablet computer. These motions (A, B) can be realized with the compass sensor (18) placed in the stylus. This can be used to enable the user to enjoy a more comfortable user experience on the tablet computer. Alternatively, a different compass sensor can also be used on the tablet computer for a more precise user experience.

Figure 6:
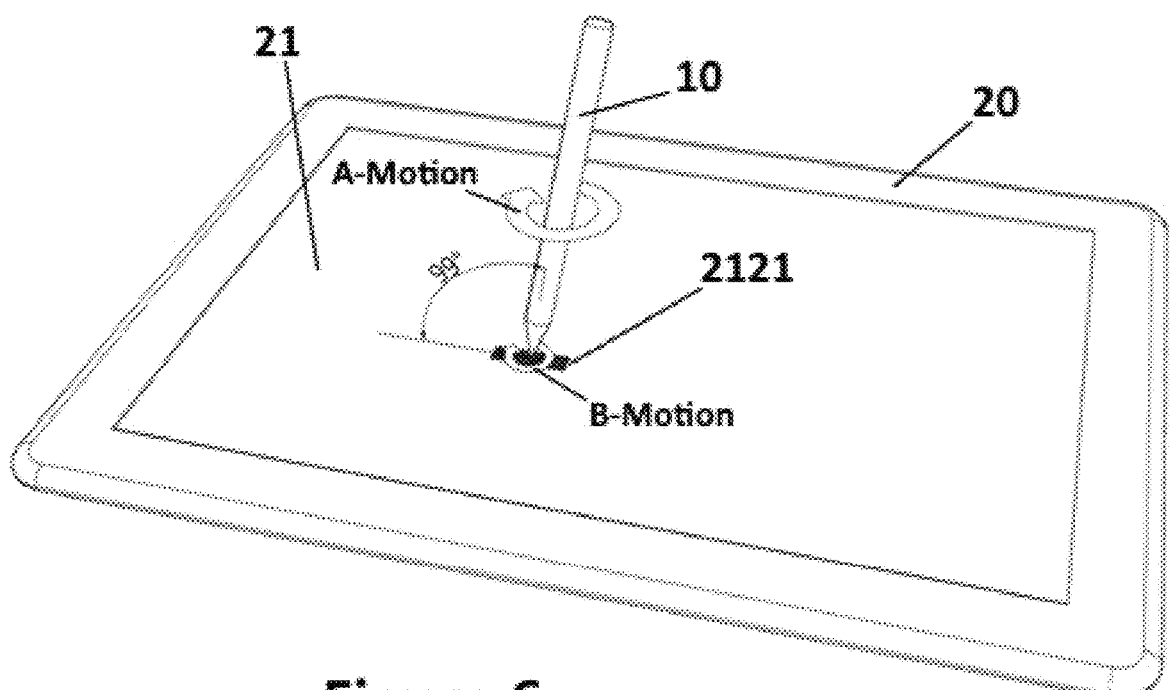
FIG. 6 shows the simultaneous operation of the inclination sensor and the compass sensor.

FIG. 6 explains the simultaneous operation of the inclination sensor (19) and the compass sensor (18) are described. The first device (10) is a stylus and the second device (20) is a tablet computer with a capacitive multi-touch panel (21). Input chart (2121) is formed by giving the negative electricity which is continuously open to the capacitive multi-touch panel (21). The stylus forms the input chart (2121) to be used for drawing on the graphic area (212) under the capacitive multi-touch panel (21). According to this figure, a drawing or a line can be made on the graphic area (212). This figure can be supplied with various effects and shapes via the compass sensor (18) and the inclination sensor (19). The angle of the stylus to the tablet computer can be measured by the inclination sensor (19) to enlarge or change the input chart (2121). Simultaneously, the direction of the input chart (2121) can be adjusted by the compass sensor (18) of the stylus. When the stylus makes A-Motion, the input chart (2121) will make B-Motion. In addition, when the angle of movement, which is 99 degrees, comes to a different angle, the input chart (2121) can take different shapes.

I claim:

1. A method of wireless data communication between a first device and a second device, the method comprising;

turning on the first device and the second device, the first device capable of data generation and/or data storage, the second device capable of data generation and/or data storage, said second device is electrically connected with a capacitive multi-touch panel;

turning on the first device;

placing the first device on the capacitive multi-touch panel connected with the second device;

sending the signals defining the identification and position information of the first device on the capacitive multi-touch panel;

receiving the signals sent by the first device on the capacitive multi-touch panel;

blanking of the image blanking unit located within the capacitive multi-touch panel, corresponding to the bottom of the first device;

sending of the information from the second device to the first device, containing the confirmation that the identity and location of the first device is received and it is ready to receive data, by means of light signals through the data transfer units;

identification by the first device through converting the light signals emitted by the data transfer units into data thereof that the second device recognized it and is ready to receive data;

transferring the data by using capacitive multi-touch panel from the first device to the second device or from the second device to the first device;

after performing the data transmission that the user wishes to perform, the user disconnects the connection of the first device with the second device;

wherein;

a stylus with a conductor tip, is used as the first device, a tablet computer with a capacitive multi-touch panel, is used as the second device, the identity of the stylus is transferred to the tablet computer by means of the negative electric signals which is created in a manner that the conductor tip touches to the capacitive multi-touch panel of the tablet computer, the tablet computer sends the light signals to the stylus by using the display units under the capacitive multi-touch panel, these light signals is taken by a light sensor of the stylus, after the mutual data signals have been transmitted, the two devices recognize each other and mutual handshake is ensured.

2. The method of claim 1, wherein, the data is transferred by using capacitive multi-touch panel from the stylus to the tablet computer by negative electric signals or from the tablet computer to the stylus by the light signals.

3. The method of claim 1, wherein, the stylus includes a compass sensor which controls the directional changes of the tablet computer.

4. The method of claim 1, wherein, the stylus includes an inclination sensor to find the angle of the tablet computer and the stylus relative to each other.

5. The method of claim 1, wherein, the stylus includes a pressure sensor for measuring the pressure applied to the capacitive multi-touch panel of the tablet computer.

6. The method of claim 1, wherein, the stylus includes a processor, a circuit board and a electrical supply for data storage and communication.

7. The method of claim 1, wherein, the tablet computer may include an inclination sensor to find the angle of the stylus which moves on it.

8. The method of claim 1, wherein, the tablet computer may include a compass sensor to find the direction of the stylus which moves on it.

9. The method of claim 1, wherein, when said stylus performs A-Motion, B-Motion is made in the same direction in the graphic area of the tablet computer, and these motions (A, B) can be realized with the compass sensor placed in the stylus.

10. The method of claim 1, wherein, the stylus forms an input chart to be used for drawing on the graphic area under the capacitive multi-touch panel in am manner that said input chart is formed by giving the negative electricity which is continuously open to the capacitive multi-touch panel.

11. The method of claim 1, wherein, the identity of the stylus is transferred to the tablet computer by means of the negative electric signals which is created in a manner that the conductor tip touches to the capacitive multi-touch panel of the tablet computer, negative electricity coming from the conductor tip can always remain open at point 1 to generate a continuous signal, in the meantime, if the data signal is to be sent again, the data signals consisting of 1 and 0 will be transmitted to the opposite side using negative electricity.

12. The method of claim 1, wherein, the tablet computer sends the light signals to the stylus by using the display units under the capacitive multi-touch panel, these light signals is taken by a light sensor of the stylus, after the mutual data signals, respectively the negatif electric signals and the light signals, have been transmitted, the two devices recognize each other and mutual handshake is ensured.

* * * * *